(12) United States Patent
Kallay

(10) Patent No.: US 7,423,643 B2
(45) Date of Patent: Sep. 9, 2008

(54) METHOD AND SYSTEM FOR TESSELATING A POLYGON

(75) Inventor: Michael Kallay, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/218,025

(22) Filed: Aug. 31, 2005

(65) Prior Publication Data

US 2006/0007231 A1      Jan. 12, 2006

Related U.S. Application Data

(63) Continuation of application No. 10/331,011, filed on Dec. 27, 2002, now Pat. No. 7,002,574.

(51) Int. Cl.
*G06T 15/30*     (2006.01)
*G06T 17/20*     (2006.01)

(52) U.S. Cl. ........................................ 345/423
(58) Field of Classification Search ............ 345/423
See application file for complete search history.

(56) References Cited

U.S. PATENT DOCUMENTS

| | | | | |
|---|---|---|---|---|
| 5,129,051 A | * | 7/1992 | Cain | 345/423 |
| 5,276,783 A | * | 1/1994 | Fossum | 345/423 |
| 5,377,320 A | * | 12/1994 | Abi-Ezzi et al. | 345/502 |
| 5,448,687 A | * | 9/1995 | Hoogerhyde et al. | 345/423 |
| 5,630,039 A | * | 5/1997 | Fossum | 345/443 |
| 5,771,045 A | * | 6/1998 | Ghavam et al. | 345/423 |
| 6,285,375 B1 | * | 9/2001 | John, Jr. | 345/440 |
| 6,806,874 B2 | * | 10/2004 | Biermann et al. | 345/420 |

* cited by examiner

*Primary Examiner*—Ulka Chauhan
*Assistant Examiner*—Jason M Repko
(74) *Attorney, Agent, or Firm*—Merchant & Gould P.C.

(57) ABSTRACT

A method and system for tessellating a polygon is provided, in which a polygon is divided into bands, each band being bounded by a pair of chains. Each chain is made up of one or more line segments of the polygon. The bands are merged with one another and/or split as needed. Each band is then subdivided into constituent triangles, which may then be sent to a graphics card of a computer. The graphics card then renders the polygon on a monitor by reassembling the constituent triangles.

20 Claims, 22 Drawing Sheets

METHOD AND SYSTEM FOR TESSELATING A POLYGON

This application is a continuation of application Ser. No. 10/331,011, filed Dec. 27, 2002, which application is incorporated herein by reference.

TECHNICAL FIELD OF THE INVENTION

The invention relates generally to computer graphics and, more specifically, to polygon tessellation techniques.

BACKGROUND

As computer processors have become faster and computer memory has become cheaper, computer software has, in general, become more graphics intensive. This has given rise to a multitude of techniques for quickly rendering images on computer monitors. One commonly used technique is called tessellation. Tessellation involves breaking up shapes into groups of triangles, and sending the triangles to a graphics card, which then reconstructs the shapes onto a monitor. Since modern graphics cards are well suited to work with triangles, tessellation is very efficient when compared to other techniques, such as bit mapping. Furthermore, because tessellation is so widely used, developers are always in search of faster and more efficient ways to tessellate shapes.

SUMMARY

In accordance with the foregoing, a method and system of tessellating a polygon is provided herein. In various embodiments of the invention, a polygon is divided into bands, each band being bounded by a pair of chains. Each chain is made up of one or more line segments of the polygon. The bands are merged with one another and/or split as needed.

Additional aspects of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention may be best understood from the following detailed description taken in conjunction with the accompanying drawings of which:

DETAILED DESCRIPTION

Prior to proceeding with a description of the various embodiments of the invention, a description of the computer and networking environment in which the various embodiments of the invention may be practiced will now be provided. Although it is not required, the present invention may be implemented by programs that are executed by a computer. Generally, programs include routines, objects, components, data structures and the like that perform particular tasks or implement particular abstract data types. The term "program" as used herein may connote a single program module or multiple program modules acting in concert. The term "computer" as used herein includes any device that electronically executes one or more programs, such as personal computers (PCs), hand-held devices, multi-processor systems, microprocessor-based programmable consumer electronics, network PCs, minicomputers, mainframe computers, consumer appliances that have microprocessors or microcontrollers, routers, gateways, hubs and the like. The invention may also be employed in distributed computing environments, where tasks are performed by remote processing devices that are linked through a communications network. In a distributed computing environment, programs may be located in both local and remote memory storage devices.

Figure 1:
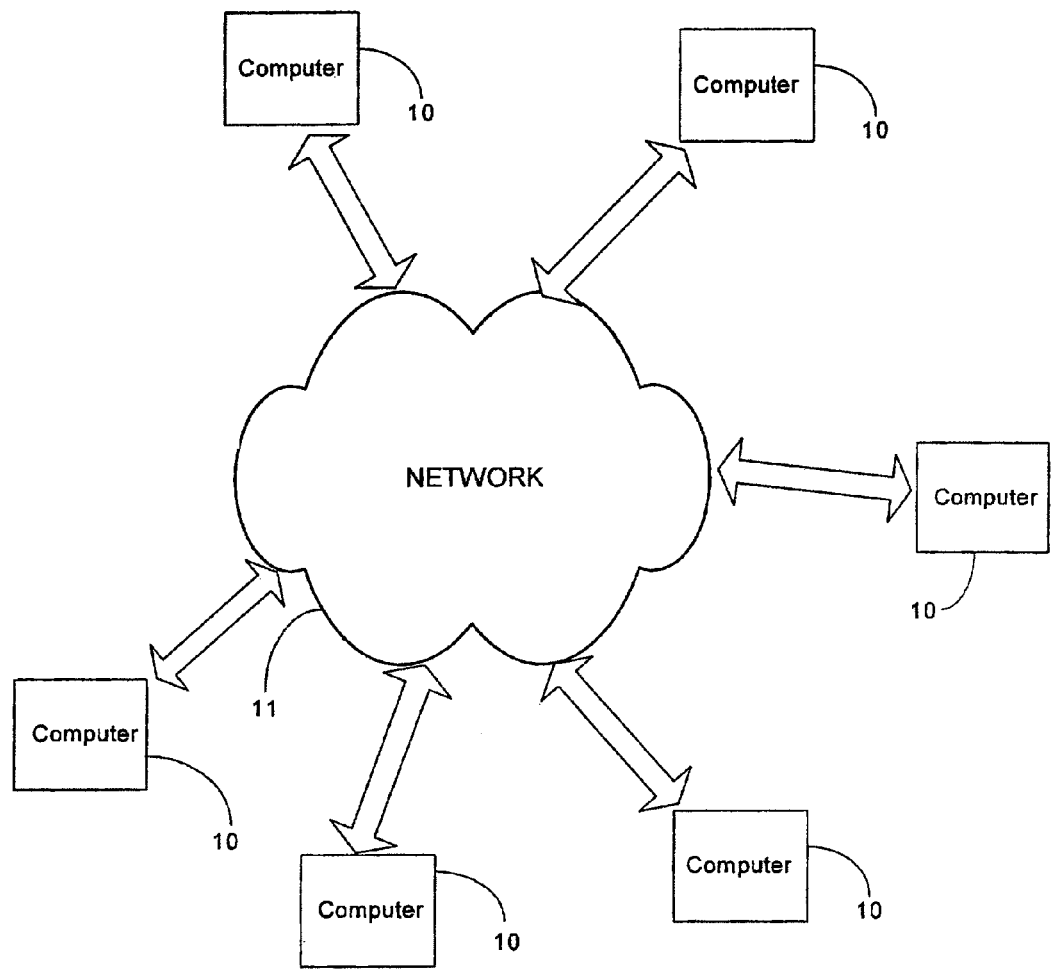
FIG. 1 illustrates an example of a computer network in which the invention may be practiced.

An example of a networked environment in which the invention may be used will now be described with reference to FIG. 1. The example network includes several computers 10 communicating with one another over a network 11, represented by a cloud. Network 11 may include many well-known components, such as routers, gateways, hubs, etc. and allows the computers 10 to communicate via wired and/or wireless media. When interacting with one another of the network 11, one or more of the computers may act as clients, servers or peers with respect to other computers. Accordingly, the various embodiments of the invention may be practiced on clients, servers, peers or combinations thereof, even though specific examples contained herein do not refer to all of these types of computers.

Figure 2:
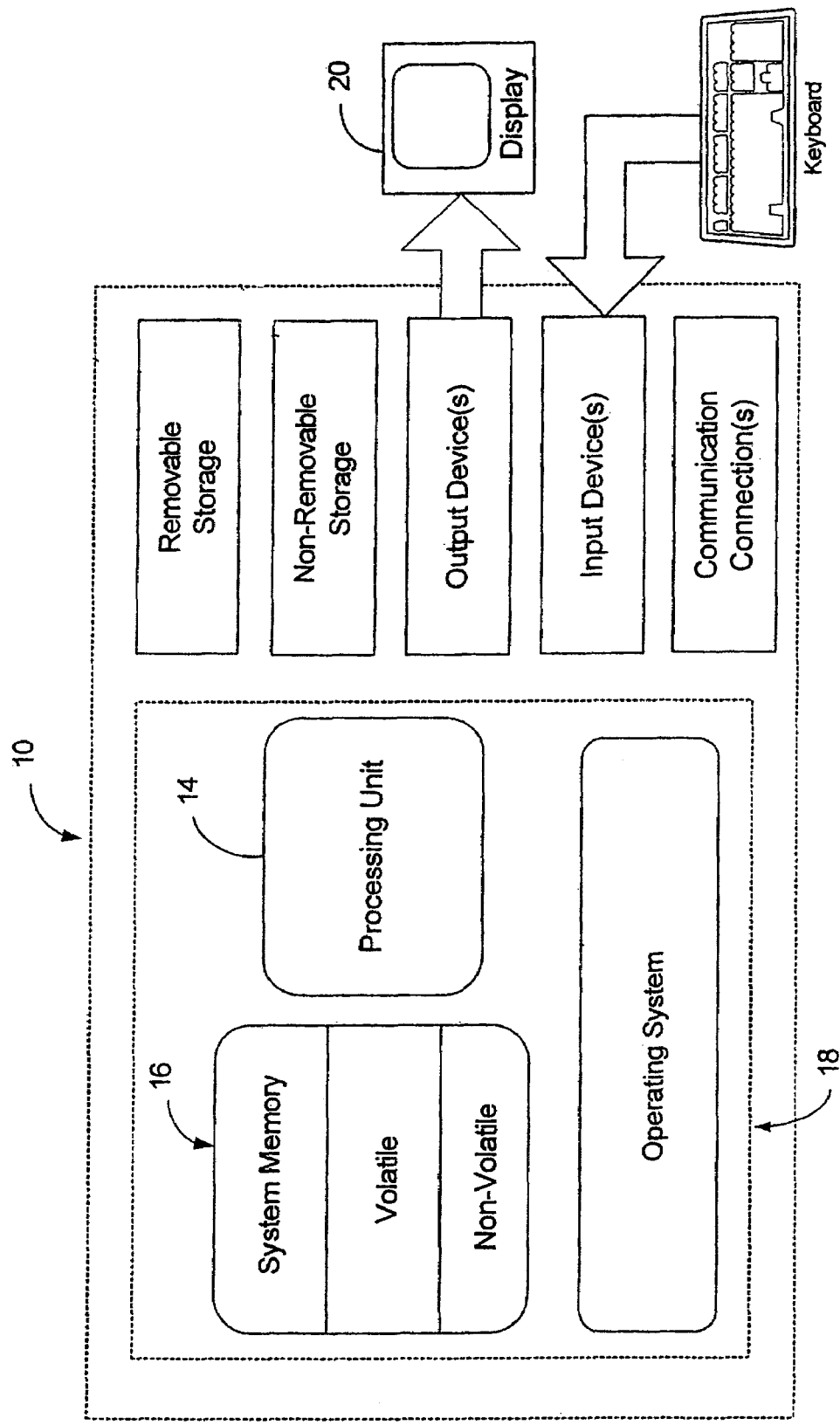
FIG. 2 illustrates an example of a computer on which at least some parts of the invention may be implemented.

Referring to FIG. 2, an example of a basic configuration for a computer on which all or parts of the invention described herein may be implemented is shown. In its most basic configuration, the computer 10 typically includes at least one processing unit 14 and memory 16. The processing unit 14 executes instructions to carry out tasks in accordance with various embodiments of the invention. In carrying out such tasks, the processing unit 14 may transmit electronic signals to other parts of the computer 10 and to devices outside of the computer 10 to cause some result. Depending on the exact configuration and type of the computer 10, the memory 16 may be volatile (such as RAM), non-volatile (such as ROM or flash memory) or some combination of the two. This most basic configuration is illustrated in FIG. 2 by dashed line 18. Additionally, the computer may also have additional features/functionality. For example, computer 10 may also include additional storage (removable and/or non-removable) including, but not limited to, magnetic or optical disks or tape. Computer storage media includes volatile and non-volatile, removable and non-removable media implemented in any method or technology for storage of information, including computer-executable instructions, data structures, program modules, or other data. Computer storage media includes, but is not limited to, RAM, ROM, EEPROM, flash memory, CD-ROM, digital versatile disk (DVD) or other optical storage, magnetic cassettes, magnetic tape, magnetic disk storage or other magnetic storage devices, or any other medium which can be used to stored the desired information and which can be accessed by the computer 10. Any such computer storage media may be part of computer 10.

Computer 10 may also contain communications connections that allow the device to communicate with other devices.

Computer 10 may also have input devices such as a keyboard, mouse, pen, voice input device, touch input device, etc. Output devices such as a display 20, speakers, a printer, etc. may also be included. All these devices are well known in the art and need not be discussed at length here. Additionally, the display 20 may be one of two, or one of several displays acting as output devices for the computer 10.

The invention is generally directed to a method and system for tessellating a polygon, in which the line segments that make up the polygon are grouped into chains, and the chains are organized into pairs, with each pair of chains defining a fill region for the polygon. Individual bands are split into multiple bands and/or merged with other bands as needed. Each band is then subdivided into constituent triangles, which may then be sent to a graphics card of a computer. The graphics card then renders the polygon on a monitor by reassembling the constituent triangles.

The procedures that are carried out to tessellate a polygon according to various embodiments of the invention will now be described. As a preliminary note, the term polygon as used herein includes both simple and complex polygons. A simple polygon is one that does not self-intersect, while a complex polygon is one that does. Also, for the sake of clarity, the description will assume that the procedures are being performed by a computer program. The program is assumed to be executing on the computer 10 of FIG. 2. However, it is to be understood that the various embodiments of the invention may be carried out on any kind of computer, and may, in fact, be carried out on multiple computers simultaneously.

In an embodiment of the invention, the program scans the vertices of the polygon in descending order according to the y-coordinates of the vertices, or by the x-coordinates of the vertices if the y-coordinates of two or more vertices are equal. This order will be referred as the height order or height. It is to be understood, however, that the invention could also be implemented so that the order in which the polygon is processed is derived primarily from x-coordinates, and secondarily from y-coordinates. The program conceptualizes the polygon as a set of chains. A chain is a segment or sequence of contiguous segments of the polygon whose vertices are in descending height order. Initially the program breaks the polygon into chains by traversing all of its vertices. At every local minimum and local maximum (of vertex height) at least one chain ends and at least one chain begins. The beginning of a chain will be referred to herein as its head, while the end of a chain will be referred to as its tail. The program inserts references to the chains into a main chain list, sorted (in descending order) by the height of their heads. Each chain is represented by a data structure that includes a reference to the chain's head, a reference to the chain's tail and a reference to each vertex along the chain.

According to one embodiment of the invention, the program operates in two scan passes. In each scan pass, the program processes chains of the polygon at their vertices. The vertex at which a chain was most recently processed is denoted by a pointer called the chain's cursor. The next vertex down the chain from the pointer is called the chain's candidate vertex. The program activates a chain when the program encounters the chain's head while scanning down the polygon. The program deactivates the chain after it processes the chain at the chain's last vertex. The program maintains two working lists of chain references. The active chains list contains references to the chains that program is currently processing, and is sorted according to where the chains are located horizontally, from left to right. The candidate list contains references to the active chains, and is sorted by the height of each chain's candidate vertex.

During its first scan pass, the program splits the chains at the points at which they intersect one another. As a result, when the program conducts its second scan pass it is able to assume that the only vertices that will coincide are chain heads and chain tails. When multiple chains have coincident vertices, the program organizes those chains into a junction. The chains that begin at the junction are called head chains, while those chains that end at the junction are called tail chains. A junction data structure keeps track of head and tail chains in a junction. The program flushes a junction when it encounters a vertex (on one of the chains of the junction) that does not coincide with the vertices that prompted the formation of the junction. According to one embodiment of the invention, the program calls a task-specific virtual method to flush the junction. The method removes all tail chains in the junction from the active chain list, and resets the junction data structure to a pristine state.

The junction has another role as well. When the program activates a new chain, it needs to determine the left/right location of its head among the active chains. The program may use an "Is-Point-Right-Of-Chain" test to make this determination, but this test will fail if the new head coincides with the head of an existing chain. In that case, the program needs to compare the directions of the segments of the two coincident chains to assign it a sequence in the active chains list. Thus, when a new chain is activated and its head coincides with the current junction, the program determines the ordering of its active chains list by searching among the heads in the junction data structure, since the chains in the junction data structure have already been ordered in this manner.

The program activates a chain in the main chain list by inserting a reference to it into the active chains list and into the candidate list, and does so after all the vertices above the chain's head have been encountered during the processing of the chain. In general, the program picks, for processing, the higher of the following: the chain having the highest candidate vertex (in the candidate list) and the top inactive chain (in the main chain list). If the chain having the highest candidate vertex and the head of the top inactive chain coincide, then the program activates the top inactive chain first.

When the program activates a chain, the program makes the cursor point to the chain's head. The chain's head is, by definition, the location of the chain's highest vertex. When the program identifies the highest vertex in the candidate list, it removes, from the candidate list, a chain that includes that vertex. As previously noted, however, there may be more than one chain that includes that vertex. The program processes the chain, changes the cursor so that it points to that vertex and inserts the chain back into the candidate list according to the height of its new candidate vertex (which is the next vertex down from the one to which the cursor now points). If, however, the chain has no more vertices (and therefore no new candidate vertex), the program marks the chain as a tail in the junction. The program deactivates that chain when the junction to which it belongs is flushed.

Figure 3A:
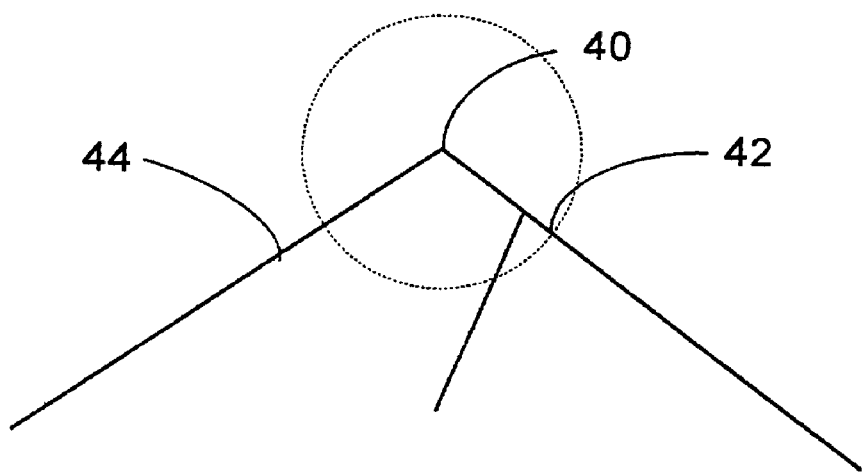
FIGS. 3A and 3B illustrate how multiple vertices are snapped together in accordance with an embodiment of the invention.
Figure 3B:
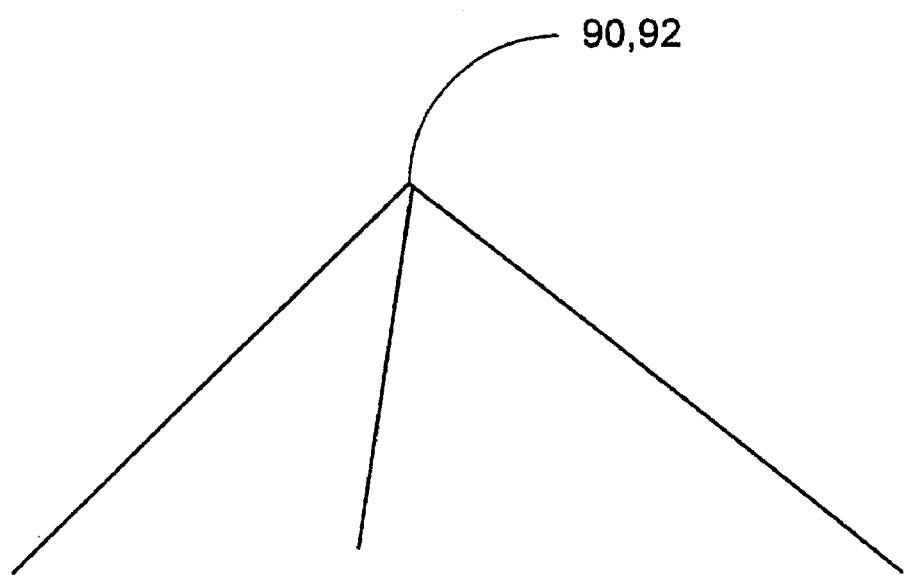

In an embodiment of the invention, the first and second scanning passes are similar to one another. However, in each scanning pass, the program takes different action when processing a chain or flushing a junction. The general procedure that the program carries out during its first pass through a polygon according to an embodiment of the invention will now be described. The program starts at the top of the polygon and works its way down to the bottom, identifying vertices and processing the chains to which they belong. When there are multiple vertices near one another, the program may consider the vertices to be coincident (part of a single junction) if they are within a certain distance of one another. For example, referring to FIG. 3A, a first vertex 40 and a second vertex 42 are shown. The tolerance between the first vertex 40 and the second vertex 42 is denoted by a dashed line 44. Since the first vertex 40 and the second vertex 42 are within the prescribed tolerance, the program "snaps" the second vertex 42 to the first vertex 40 as shown in FIG. 3B. In other words, the program changes the coordinates of the second vertex 42 so that they equal those of the first vertex 40.

Figure 4:
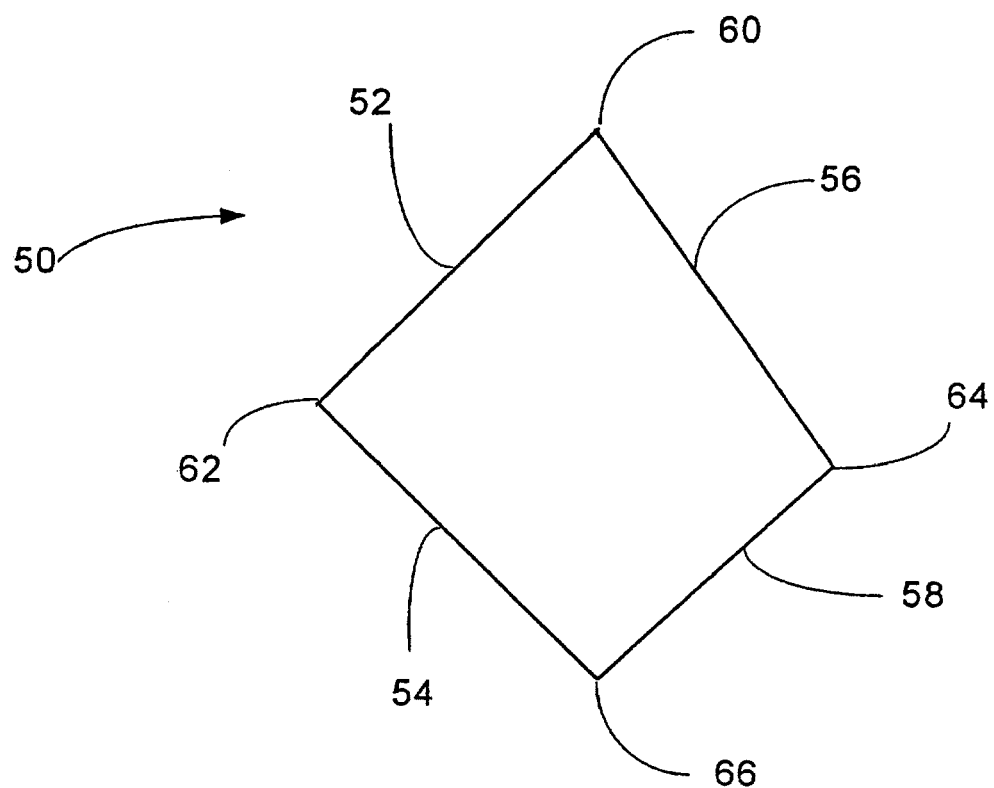
FIG. 4 illustrates a polygon.

Before the first scan pass, the program groups the line segments and vertices into chains. To illustrate, reference is made to FIG. 4, in which a polygon 50 is shown. The polygon 50 includes four line segments—a first segment 52, a second segment 54, a third segment 56 and a fourth segment 58. The polygon 50 has four vertices—a first vertex 60, a second vertex 62, a third vertex 64 and a fourth vertex 66. The program divides the polygon 50 into two chains—a first chain, which includes the first segment 52 and the second segment 54, and a second chain, which includes the third segment 56 and the fourth segment 58. As represented in memory by the program, the head of the first chain refers to the first vertex 60, while the tail of the first chain refers to the fourth vertex 66. Similarly, the head of the second chain refers to the first vertex 60, while its tail refers to the fourth vertex 66. The first and second chains do not keep track of the fact that they are referring to the same vertices.

The highest vertex of the polygon 50 is the first vertex 60. Although the first and second chains bath have a reference to the first vertex 60, the first program processes the first chain prior to processing the second chain. The second vertex 62 is the next highest vertex in the polygon 50. Thus, the program makes the cursor point to the second vertex 62. When the program activates the first chain, it defines a junction at the first chain's head, and adds a reference to the first chain to the junction data structure. The next chain that the program processes is the second chain. In processing the second chain, the program finds that the second chain coincides with the junction, so a reference to the second chain is added to the junction data structure. The program then moves to the second vertex 62. The second vertex 62 does not coincide with the junction, so the program flushes the junction and removes the references to the first and second chains from the junction data structure.

As previously noted, the program classifies chains at a junction as either head chains or tail chains. Head chains are those chains that start at the junction, while chains that end at the junction are classified as tail chains. For example, in the polygon 50 of FIG. 4, with regard to junction of the first vertex 60, the program classifies the first and second chains as head chains.

Figure 5A:
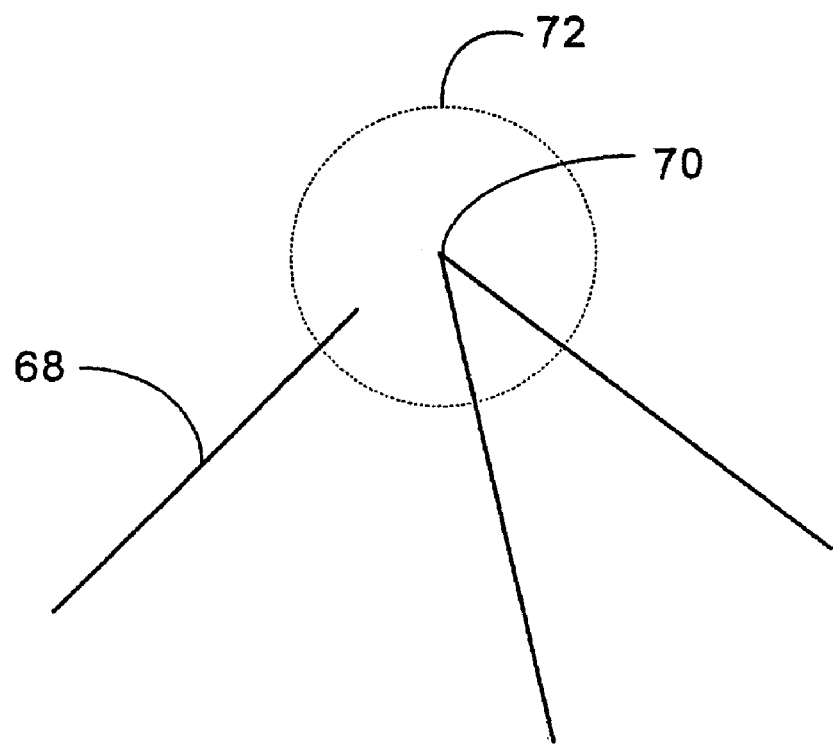
FIGS. 5A and 5B illustrate how a chain is snapped to a junction in accordance with an embodiment of the invention.
Figure 5B:
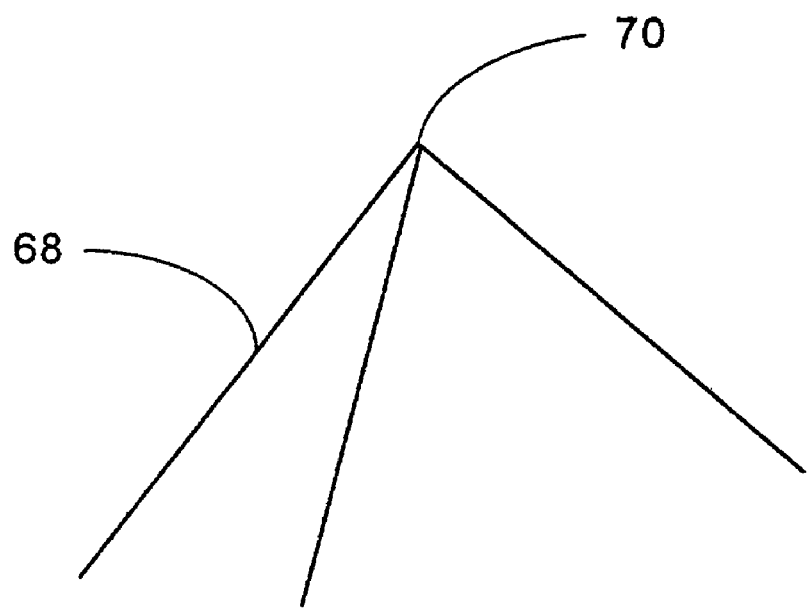

When a new chain is activated, and the current junction data structure has not yet been flushed, the program determines whether the head of the new chain is "close" (within a predetermined tolerance) to the current junction. If the program determines that the head is close, it "snaps" the head to the current junction. In other words, it changes the coordinates of the head of the new chain to match those of the junction, and adds the new chain to the current junction data structure. For example, FIG. 5A shows a chain 68 and a junction 70. The chain 68 is within a specified tolerance of the junction 70, as denoted by the dashed line 72. Thus, when the program activates the chain 68, it snaps the head of the chain 68 to the junction 70, as shown in FIG. 5B. If the program is not able to snap the new chain to the current junction, the program flushes the current junction and defines a new junction that includes the new chain.

As discussed previously, there are several circumstances under which the program flushes a currently defined junction during the first pass. In general, if the program encounters a vertex that is (a) immediately after encountering a junction in its top-to-bottom processing of the polygon and (b) is not part of the junction, then the program flushes the junction. To flush the junction, the program classifies each of the chains that terminate at the junction (i.e. those chains whose tails are at the junction) as either left, right or redundant, with respect to "fill regions" of the polygon. The definition of a fill region depends on the "fill mode" in which the program is operating. Two fill modes—Alternate Mode and Winding Mode—will be discussed herein. In both fill modes, the program defines whether or not a point is in the fill region by considering a ray cast from the point to infinity, and tallying the intersections of this ray with the polygon. In the Alternate Mode, the point is considered to be inside the fill region if the ray has an odd number of intersections with the polygon. In the Winding Mode, the program also considers the direction of the intersections of the polygon with the ray, adding 1 for right-to-left and subtracting 1 for left-to-right. In the Winding Mode, the program considers a point is to be inside the fill region if the sum is not zero.

Figure 6:
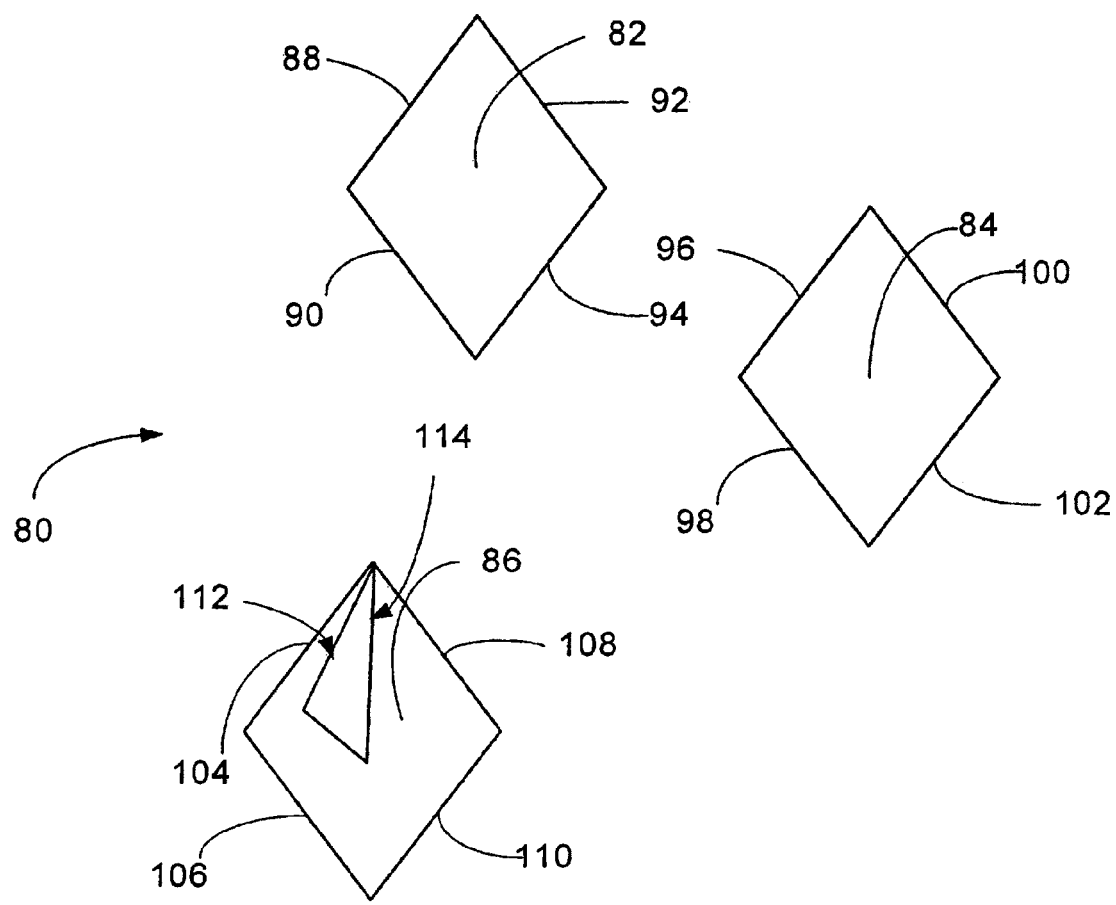
FIG. 6 illustrates a group of polygons.

Each fill region is bounded on the left by a "left chain" and bounded on the right by a "right chain." For example, a group 80 of polygons shown in FIG. 6 is divided into a first fill region 82, a second fill region 84 and a third fill region 86. The first fill region 82 is bounded on the left by a left chain made up of two segments 88 and 90, and on the right by a right chain made up of two segments 92 and 94. The second fill region 84 is bounded on the left by a left chain made up of two segments 96 and 98, and on the right by a right chain made up of two segments 100 and 102. The third fill region 86 is bounded on the left by a left chain made up of two segments 104 and 106, and on the right by a right chain made up of two segments 108 and 110. Finally, there are two unpaired chains 112 and 114 that exists amid the group 80 of polygons that is considered to be "redundant," since they do not define the boundary of any fill region.

Figure 7A:
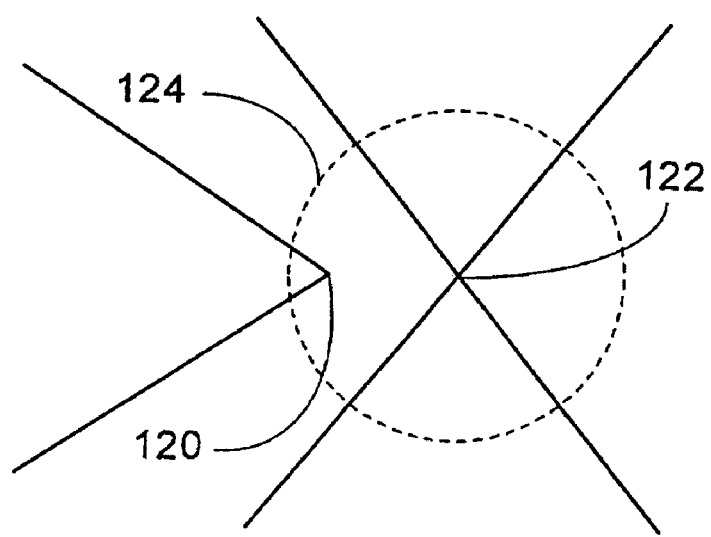
FIGS. 7A and 7B illustrate how a vertex is snapped, to an intersection in accordance with an embodiment of the invention.
Figure 7B:
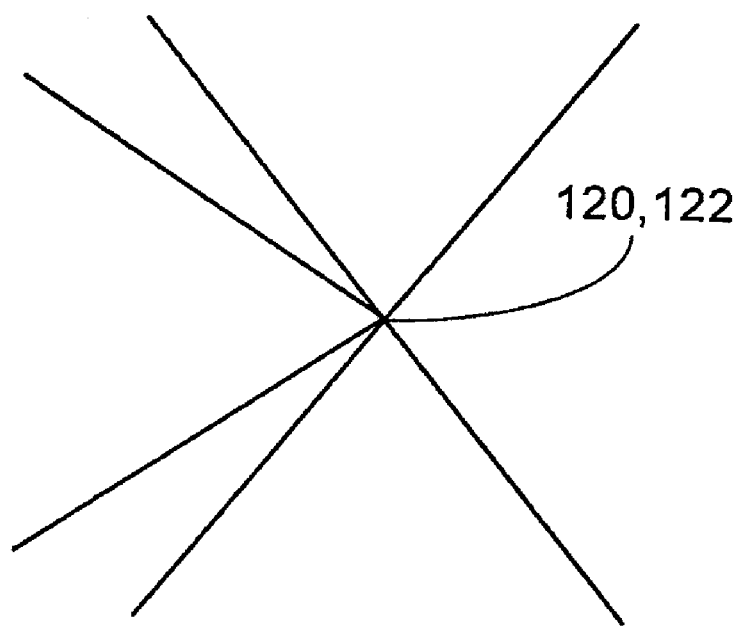
Figure 8A:
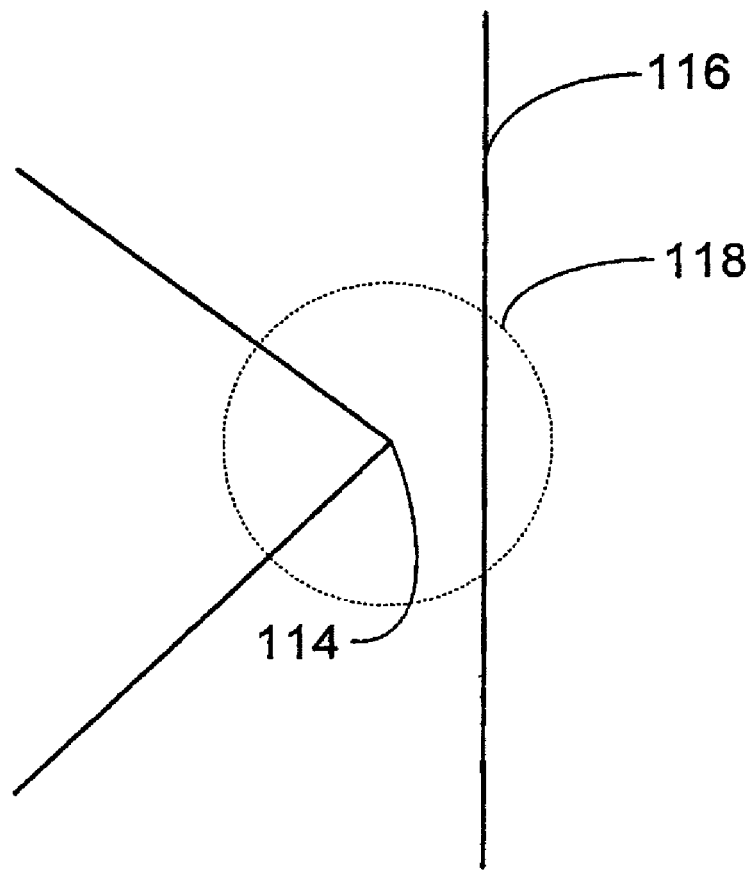
FIGS. 8A and 8B illustrate how a vertex is snapped to a chain in accordance with an embodiment of the invention.
Figure 8B:
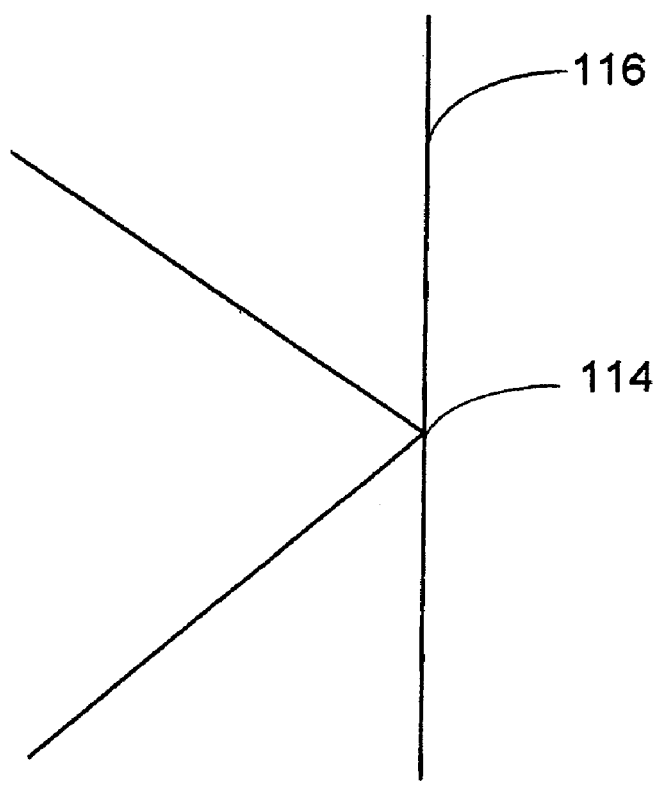
Figure 9A:
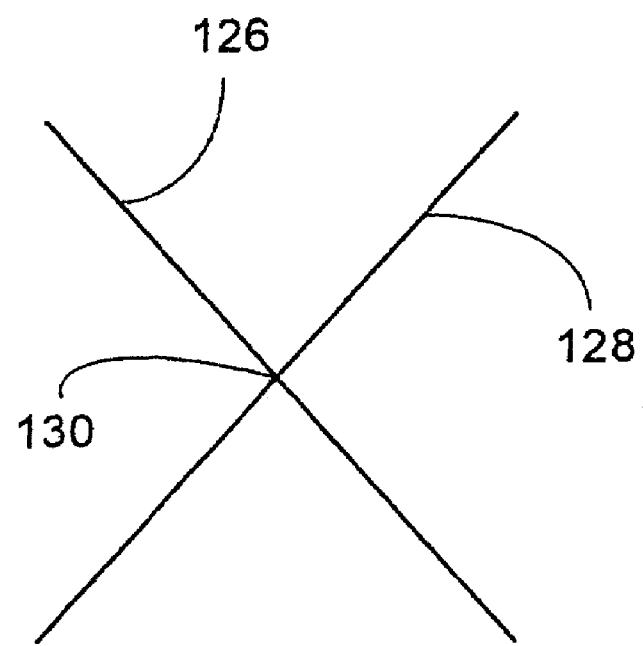
FIGS. 9A and 9B illustrate how a chain at an intersection is split in accordance with an embodiment of the invention.
Figure 9B:
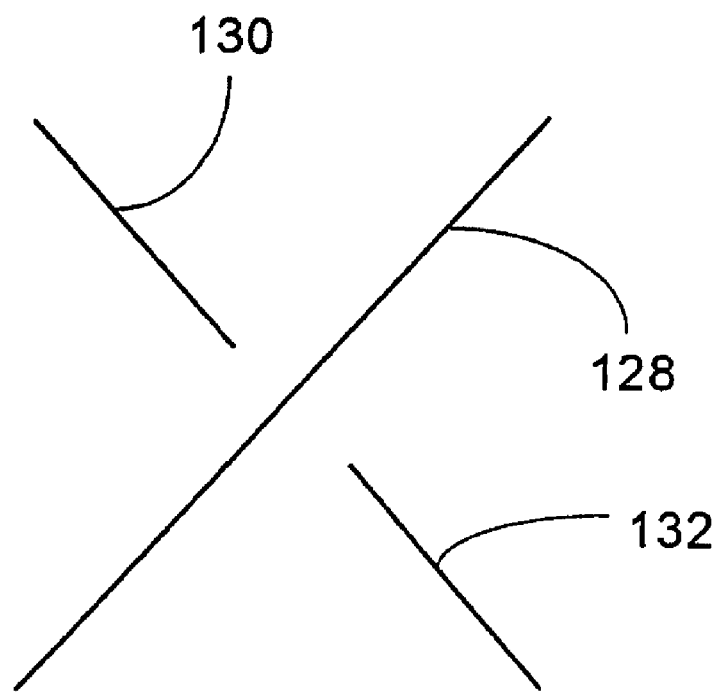

In processing a chain, the program starts with the candidate vertex (the vertex just below the one at which the cursor points) and checks below the candidate vertex along chains that also have the vertex, and determines whether any of those chains intersect other chains that don't have the vertex. If there is an intersection along one of the chains, and the intersection is close to the vertex (within a predetermined tolerance), then the program snaps the intersection to the vertex. In other words, the program changes the coordinates of the intersection to match those of the vertex. For example, FIG. 7A shows a vertex 120 and an intersection 122. The vertex 120 is within a specified tolerance of the intersection 122, as denoted by a dashed line 124. Thus, when the program processes the vertex 120, it snaps the intersection 122 to the vertex 120, as shown in FIG. 7B. If the chains do not intersect any of their neighbors, but the vertex itself is close to another chain, within a certain tolerance, then the program snaps the vertex to the chain and considers the resulting confluence of the chain and the vertex to be an intersection. For example FIG. 8A shows a vertex 114 and a chain 116. The vertex 114 is within a specified tolerance of the chain 116, as denoted by a dashed line 118. Thus, when the program reaches the vertex 114, it snaps the vertex 114 to the chain 116, as shown in FIG. 8B. In general, when the program identifies (or creates) an intersection, the program separates the line segments that are within the intersection into chains. For example FIG. 9A shows a first segment 126 and a second segment 128, which intersect at an intersection 130. The program splits the first segment 126 into two chains 130 and 132, as shown in FIG. 9B.

The general procedure that the program carries out during its second pass through a polygon according to an embodiment of the invention will now be described. As with the first pass, the program starts at the top of the polygon and works its way down to the bottom, identifying vertices, processing the chains to which they belong and flushing junctions under the appropriate conditions. In the second pass, however, the actions taken by the program in processing each chain and flushing each junction are different from those taken during the first pass. For example, during the second pass, the program divides the polygon into bands, and maintains a list of data structures that represent the bands. Each band is made up of two chains of the polygon—a left chain and a right chain—and a sequence of points, called a ceiling, connecting the left and right chains. The program carves triangles between the two chains of the band and under the band's ceiling. As needed, the program starts, terminates, merges and splits bands when the current junction is flushed.

Figure 10:
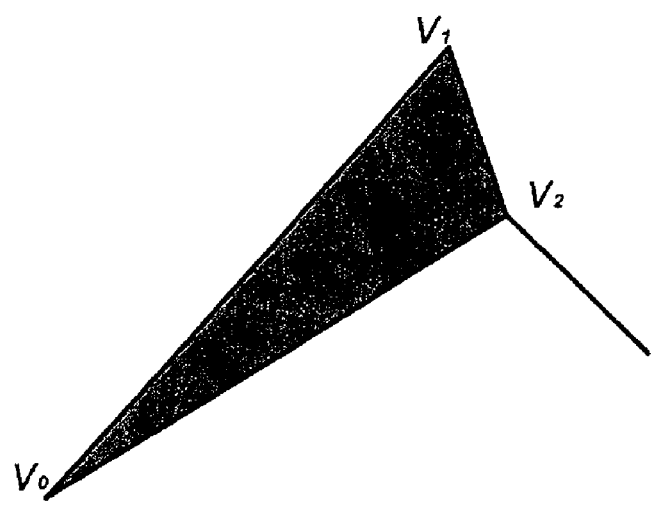
FIGS. 10-17 illustrate various procedures that are carried out in a second scan pass in accordance with various embodiments of the invention.

During the second pass, the program carves triangles from each left chain of the polygon using a set of rules. Referring to FIG. 10, the rules can be described with the following psuedocode:

Insert the vertex as the $v_0$ in the ceiling
   While the ceiling $v_0, \ldots, v_m$ contains more than one vertex,
      and $v_0, v_1, v_2$ turns right
      Carve out the triangle ($v_0, v_1, v_2$)
      Remove $v_2$ from the ceiling
   End while If the vertex is on the right chain, then the program includes it with the ceiling in a similar way from the right.

Figure 11:
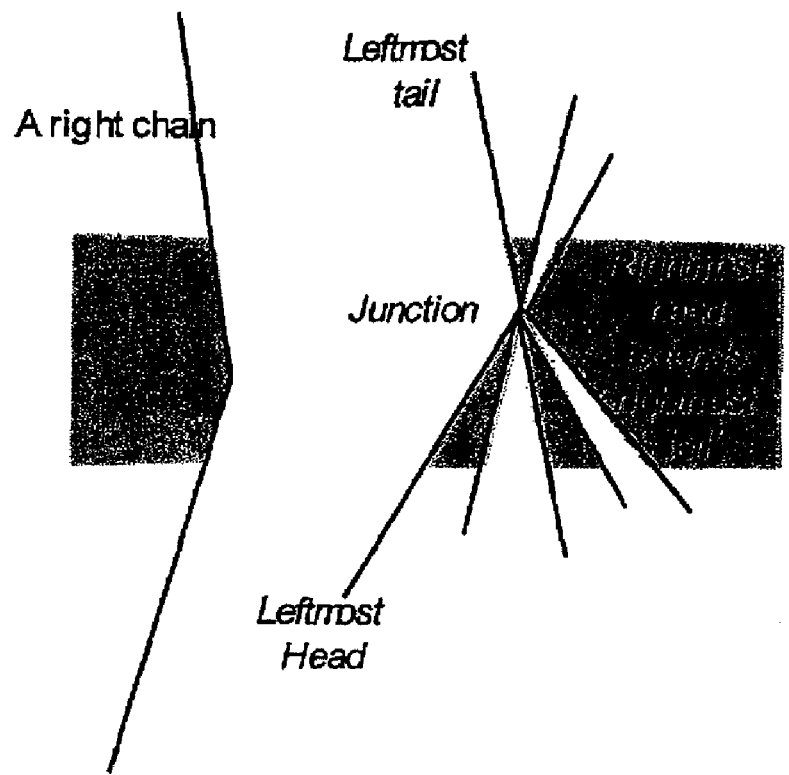
Figure 12:
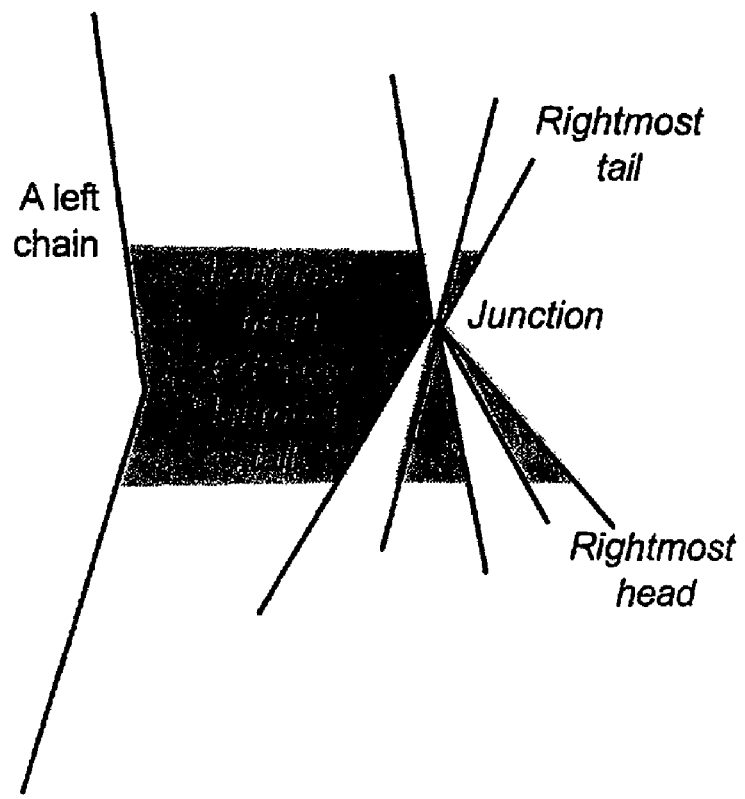

During the second pass, the program flushes a junction if the junction is nonempty, and a vertex that does not coincide with the junction is scheduled for processing. The action the program takes in flushing the junction is based on the numbers of head and tail chains that are still in the junction data structure. The total number of chains in the junction should always be even. Therefore, the numbers of head and tail chains should be both odd or both even (which includes 0). If the numbers of non-redundant head and tail chains referred to in the junction data structure are odd, then the program concludes that the junction separates between interior and exterior portions of the fill set. The program then proceeds in one of two ways, depending on the nature of the chain that is immediately to the left of the junction. As shown in FIG. 11, if the chain immediately to the left of the junction is a right chain, then the program concludes that the rightmost tail chain is a left chain. The program therefore extends the rightmost tail chain (and thus its band) with the rightmost head chain. The program then assumes that the remaining tail chains terminate existing bands and that the remaining head chains start new bands. Referring to FIG. 12, and continuing with the case of odd numbers of heads and chains, if the chain immediately to the left of the junction is a left chain, then the program extends the leftmost tail chain with the leftmost head chain and creates bands from the remaining head chains.

Figure 13:
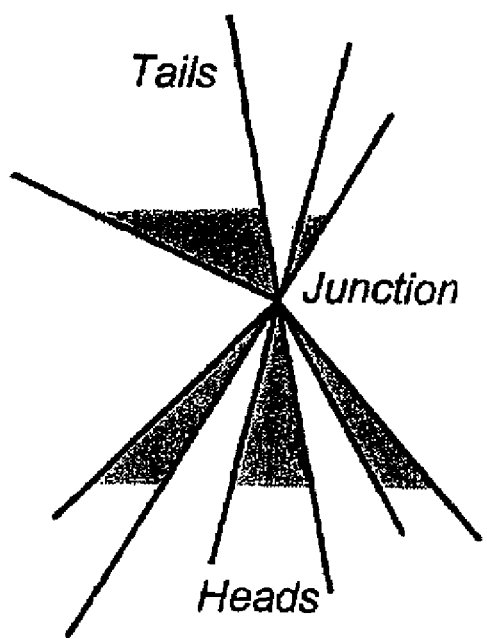
Figure 14:
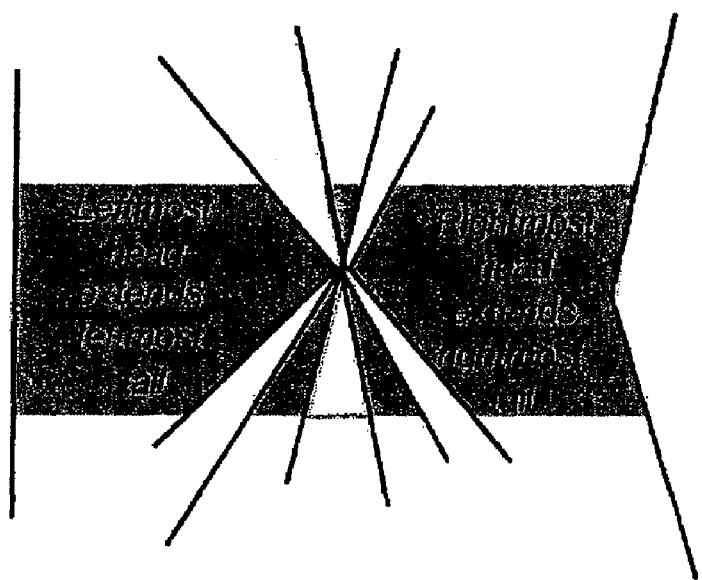

Referring to FIG. 13, if the numbers of non-redundant head and tail chains referred to in the junction data structure are even, and these chains include at least one head chain and at least one tail chain, then the program proceeds as follows. If the chain immediately to the left of the junction is a right chain, then the program assumes that the junction lies outside of the existing bands. The program then terminates every pair of tail chains into an existing band, and starts a new band with each pair of head chains. Referring to FIG. 14, if the junction immediately to the left of the junction is a right chain, then the program concludes that the junction lies inside the fill set, and that there is a right chain immediately to the right of the junction.

Figure 15:
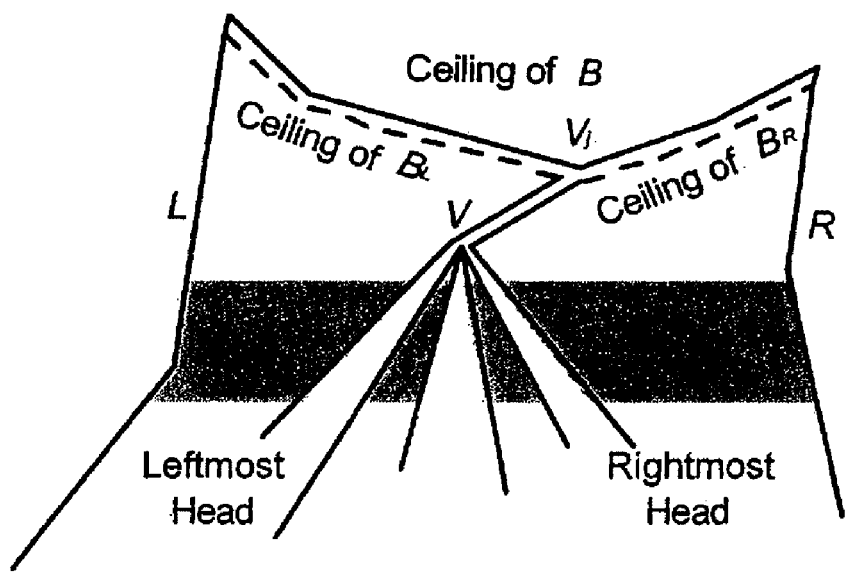

Referring to FIG. 15, if the numbers of non-redundant head and tail chains referred to in the junction data structure are even, and the number of tail chains is zero, then the program proceeds as follows. The program concludes that the junction lies between a left chain L and a right chain R of a band B. The program then splits the band B according to the following psuedocode:

Let $v_0, \ldots, v_m$ be the ceiling of band B, and let $v_j$ be the
      lowest vertex in that ceiling
      Split the ceiling at $v_j$ (thus breaking the band B)
      Create a band $B_L$ by attaching the ceiling $v_0, \ldots, v_j$ to L
         on the left and to the leftmost head chain on the right.
      Process leftmost head chain at v.
      Create a band $B_R$ by attaching the ceiling $v, v_j, \ldots, v_m$ to
         the rightmost head chain on the left to R on the right.
      Process the rightmost head chain at v.

Figure 16:
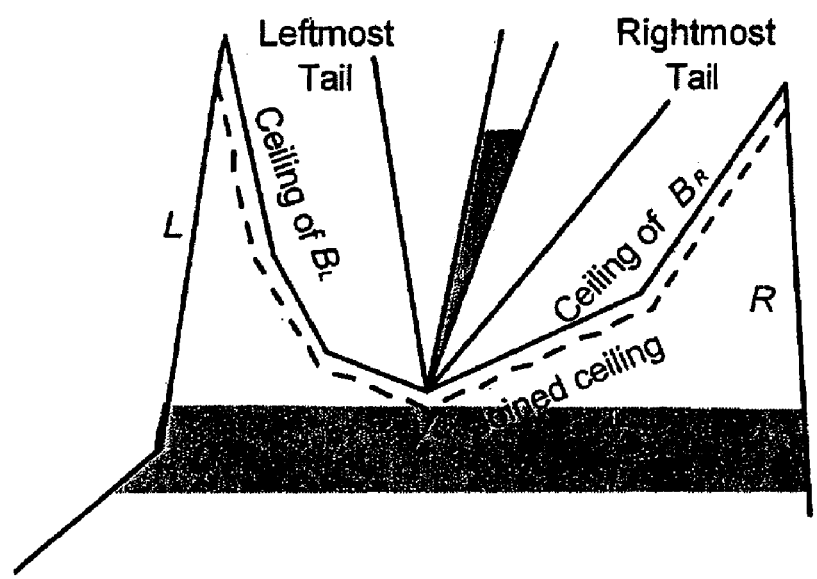

Finally, referring to FIG. 16, if the numbers of non-redundant head and tail chains referred to in the junction data structure are even, and the number of head chains is zero, then the program concludes that the tail chains that make up the junction separate a band $B_L$ on its left and a band $B_R$ on its right. The program merges these two bands by joining their ceilings.

Figure 17:
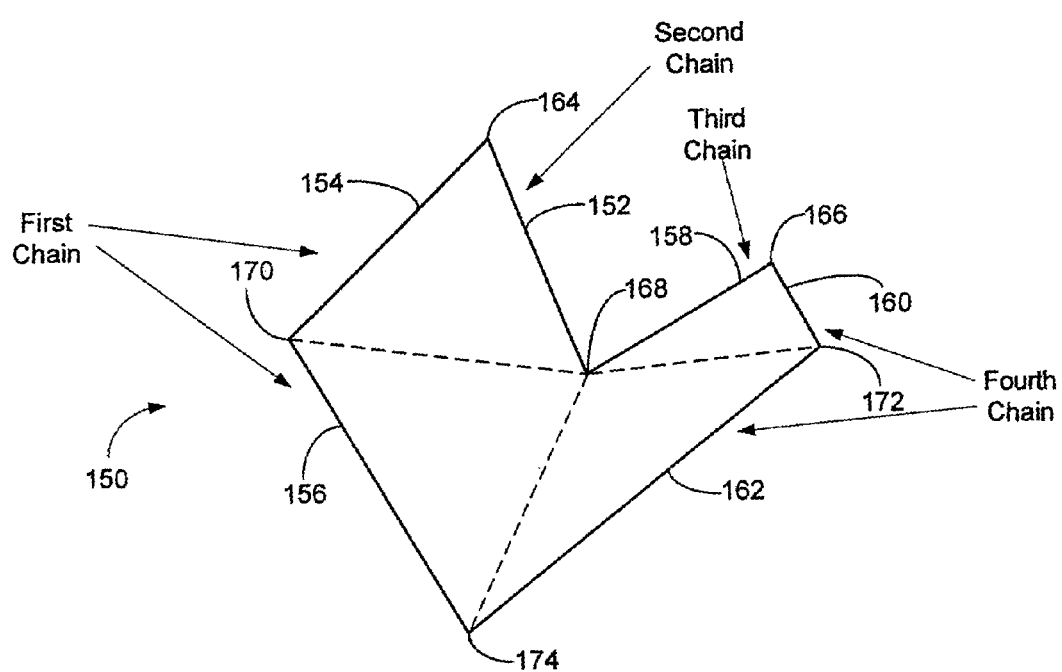

Referring to FIG. 17, an example of how the program breaks up a polygon into triangles in a second pass will now be described. A polygon 150 includes a first segment 152, a second segment 154, a third segment 156, a fourth segment 158, a fifth segment 160 and a sixth segment 162. The polygon 150 also has six vertices—a first vertex 164, a second vertex 166, a third vertex 168, a fourth vertex 170, a fifth vertex 172 and a sixth vertex 174. It is assumed in this example that the program has divided the polygon 150 into four chains—a first chain that includes the second and third segments 154 and 156, a second chain that includes the first segment 152, a third chain that includes the fourth segment 158 and a fourth chain that includes the fifth and sixth segments 160 and 162. In the first pass, the program finds no intersections, so the chains are not changed. During the second pass, the program activates the first chain at the first vertex 164, and defines a junction there, which contains a reference to the first chain. The program then activates the second chain, also at the first vertex 164, and adds, to the junction, a reference to the second chain. The program then identifies the next vertex down—the second vertex 166—and activates the third chain at the second vertex 166. The third chain's head does not coincide with the current junction, so the program flushes the junction (i.e. removes the references to the first and second chains), and defines a first band, which is bounded by the first and second chains and has a ceiling defined by the single vertex 164. Then, the program activates the chain that starts at second vertex 166—the fourth chain— and defines a junction at its head. The program also adds a reference to the fourth chain to the junction data structure. The next highest vertex among the chains of the candidate chain list is the fourth vertex 170, which is on the first chain. The fourth vertex 170 does not coincide with the current junction, so the program flushes the junction (i.e. removes the reference to the fourth chain), and defines a second band, which is bounded by the third and fourth chains and has a ceiling defined by the single vertex 166. The program then carves a triangle from the first band of the polygon 150. The vertices of this triangle are the first vertex 164, the third vertex 168, and the fourth vertex 170. The program also redefines the ceiling so that it extends from the fourth vertex 170 to the third vertex 168.

Continuing with the example, the next highest vertex is the fifth vertex 172. The program carves out a triangle from the second band of the polygon 150. The vertices of this triangle are the third vertex 168, the second vertex 166, and the fifth vertex 172. After carving out the triangle, the program redefines the ceiling is so that it extends from the third vertex 168 to the fifth vertex 172. The next is highest vertex is the third vertex 168. Thus, the program processes the second chain. The second chain is a tail chain, so the program defines a junction there, and adds, to the junction data structure, a reference to the second chain. The third chain also has a reference to the third vertex 168. The program therefore processes the third chain, and adds, to the junction data structure, a reference to the third chain. The program then identifies the next vertex down as being the sixth vertex 174. Thus, the program is about to process the fourth chain at the sixth vertex 174. Since the sixth vertex 174 does not coincide with the current junction, the program flushes the junction (i.e. removes references to the second and third chains. In flushing the junction that contains the second and third chains, the program recognizes that the junction is of the type discussed in conjunction with FIG. 16. Thus, the program merges the first and second bands of the polygon 150 at the third vertex 168. The program then defines a new ceiling that extents from the fourth vertex 170, to the third vertex 168 and to the fifth vertex 172. The program then processes vertex 174 on the fourth chain, carving out the triangle bounded by the sixth vertex 174, the fourth vertex 170, and the third vertex 168, and then another triangle bounded by the sixth vertex 174. the third vertex 168, and the fifth vertex 172. The program then redefines the ceiling to consists of the single vertex 172. Finally, the program processes the sixth vertex 174 on the fourth chain and, in doing so, discovers that the polygon 150 has been reduced to nothing. This causes the program to finish tessellating the polygon 150.

It can thus be seen that a new and useful method and system for tessellating a polygon has been provided. In view of the many possible embodiments to which the principles of this invention may be applied, it should be recognized that the embodiments described herein with respect to the drawing figures are meant to be illustrative only and should not be taken as limiting the scope of invention. Those of skill in the art will recognize that the elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

I claim:

1. A computer-implemented method for tessellating a polygon, the polygon comprising a plurality of vertices, the method comprising:
   dividing the polygon into chains, wherein each chain comprises a segment or set of contiguous segments of the polygon;
   breaking the polygon into bands, wherein each band is bounded by two or more of the chains;
   merging at least two of bands at a point in the polygon where they coincide;
   determining a ceiling associated with each band; wherein the ceiling includes a sequence of points that connects the two or more of the chains;
   dividing into triangles a portion of each of the bands that is beneath the ceiling associated with the band;
   adjusting the ceiling in response to the dividing into triangles when additional portions of the band remain to be divided into triangles;
   determining the heights of the vertices of the chains;
   determining those chains of the plurality of chains that have edges at the current height at which the polygon is currently being processed; and
   rendering the triangles to a display.

2. The method of claim 1, further comprising splitting at least one of the bands into multiple bands when a head of a new chain is encountered between a left and a right chain of the band.

3. The method of claim 1, wherein the polygon comprises vertices, and wherein breaking step comprises:
   traversing the vertices based at least in part on their respective heights in the polygon; and
   at each vertex that is a local minimum or local maximum, in terms of its height, terminating at least one chain and starting at least one chain.

4. The method of claim 1, wherein each chain has a head and a tail, the method further comprising:
   activating each chain as its head is encountered;
   deactivating each chain as the last vertex to which it is contiguous has been processed.

5. The method of claim 1, further comprising:
   populating a junction data structure that keeps track of at least one set of chains that share a common vertex; and
   flushing the junction data structure upon encountering a vertex that does not include the set of chains.

6. A computer-readable medium for tessellating a polygon, comprising:
   scanning the polygon in at least a first pass and a second pass,
   the first pass comprising
   breaking the polygon into chains; identifying at least one pair of chains that intersect; inserting references to the chains into a main chain list that is sorted by the heights of the heads of the chains; and splitting the at least one chain of the pair into two chains; and the second pass comprising
   organizing the polygon into bands, each band being bounded on the left by a left bounding chain of the plurality of chains and on the right by a right bounding chain;
   determining a ceiling associated with each band; wherein the ceiling includes a sequence of points that connects the left bounding chain and the right bounding chain;
   dividing into triangles a portion of each of the bands that is beneath the ceiling associated with the band;
   adjusting the ceiling in response to the dividing into triangles when additional portions of the band remain to be divided into triangles;
   splitting at least one of the bands into multiple bands at a particular height in the polygon; and
   rendering the triangles to a display.

7. The computer-readable medium of claim 6, further comprising, in each of the first and second passes, scanning the vertices of the polygon in descending order of height.

8. The computer-readable medium of claim 6, further comprising, in each of the first and second passes scanning the vertices of the polygon in descending order of their y-coordinates.

9. The computer-readable medium of claim 8, wherein, if the y-coordinates of two or more of the vertices are equal, scanning the two or more vertices according to their x-coordinates.

10. The computer-readable medium of claim 6, wherein the polygon comprises vertices, and wherein breaking step comprises:

traversing the vertices based at least in part on their heights in the polygon; and at each vertex that is a local minimum or local maximum, in terms of its height, terminating at least one chain and starting at least one chain.

11. The computer-readable medium of claim 6, further comprising, in the first pass, snapping together those vertices that are within a defined distance of one another.

12. The computer-readable medium of claim 6, further comprising:

in the first pass, identifying at least one chain that is within a defined distance of a junction, and snapping the head of the identified chain to the junction.

13. The computer-readable medium of claim 6, wherein the identifying step is performed for line segments near each vertex of the polygon.

14. The computer-readable medium of claim 6, further comprising:

in the first pass, for each vertex that is within a defined distance of a neighboring chain, but is not touching the neighboring chain, snapping the vertex to the chain and designating the point at which the vertex is snapped to the chain as an intersection.

15. The computer-readable medium of claim 6, further comprising:

in the first pass, for each vertex at which a chain starts, classifying each chain that starts at the vertex as a left chain, a right chain or a redundant chain.

16. The computer-readable medium of claim 6, further comprising:

in the second pass, for each band, defining one or more ceilings between its left and its right chains; and performing the dividing step based on the defined ceilings.

17. The computer-readable medium of claim 6, further comprising:

in the second pass, merging at least two of the bands at a height in the polygon at which the two bands intersect.

18. A computer system for tessellating a polygon, the computer system comprising:

a display unit:

a central processing unit for performing the steps of:

dividing the polygon into chains, wherein each chain comprises a segment or set of contiguous segments of the polygon, breaking the shape into bands, wherein each band is bounded by two or more of the chains, merging at least two of the bands at a point in the polygon where they coincide, maintaining references to those chains that have edges at the current height at which the polygon is currently being processed, determining a ceiling associated with each band; wherein the ceiling includes a sequence of points that connects the two or more of the chains;

dividing into triangles a portion of each of the bands that is beneath the ceiling associated with the band; and adjusting the ceiling in response to the dividing into triangles when additional portions of the band remain to be divided into triangles;

and a graphics processing unit for performing the steps of:

receiving the triangles from the central processing unit; and rendering the triangles on the display unit.

19. The computer system of claim 18, further comprising splitting at least one of the bands into multiple bands when a head of a new chain is encountered between a left and a right chain of the band.

20. The computer system of claim 18 wherein the polygon comprises vertices, and wherein breaking step comprises traversing the vertices based at least in part on their respective heights in the polygon; and at each vertex that is a local minimum or local maximum, in terms of its height, terminating at least one chain and starting at least one chain.

* * * * *